United States Patent [19]

Sato

[11] 4,140,456

[45] Feb. 20, 1979

[54] APPARATUS FOR POLISHING SIDE FACES OF SOAPS

[75] Inventor: Atushi Sato, Chiba, Japan

[73] Assignee: Kao Soap Co., Ltd., Tokyo, Japan

[21] Appl. No.: 803,620

[22] Filed: Jun. 6, 1977

[30] Foreign Application Priority Data

Jul. 13, 1976 [JP] Japan ................................. 51-83134

[51] Int. Cl.$^2$ ................................................ B29C 17/12

[52] U.S. Cl. ....................................... 425/371; 51/140; 425/394; 425/402

[58] Field of Search ............... 425/230, 385, 371, 335, 425/394, 402; 51/140, 262 A; 15/256.5

[56] References Cited

U.S. PATENT DOCUMENTS

| | | | |
|---|---|---|---|
| 513,880 | 1/1894 | Shebesta et al. | 51/140 |
| 799,442 | 9/1905 | Bornman | 51/140 |
| 1,502,130 | 7/1924 | Clair | 51/140 |

FOREIGN PATENT DOCUMENTS

| | | | |
|---|---|---|---|
| 1061223 | 7/1959 | Fed. Rep. of Germany | 51/140 |
| 2412173 | 9/1975 | Fed. Rep. of Germany | 51/140 |
| 364415 | 2/1973 | U.S.S.R. | 51/262 A |

*Primary Examiner*—Robert L. Spicer, Jr.
*Attorney, Agent, or Firm*—Blanchard, Flynn, Thiel, Boutell & Tanis

[57] ABSTRACT

The circumferential wall of a round soap bar is polished by pressing a pair of polishing cloths against substantially diametrically opposite portions of said circumferential wall and rotating the soap bar.

6 Claims, 3 Drawing Figures

APPARATUS FOR POLISHING SIDE FACES OF SOAPS

The present invention relates to an apparatus for polishing the circumferential side walls of round, soap bars, such as facial and hand soap bars. In this context, the term "soap" includes synthetic detergents useful for cleaning the human skin, as well as higher fatty acid carboxylates. More particularly, the invention relates to a soap bar polishing apparatus in which diametrically opposite portions of the side walls of soap bars are pressed by a pair of polishing cloths and these polishing cloths are moved so as to rotate the soap bars and to cause sliding friction between the polishing cloths and the circumferential walls of the soap bars.

The present invention will now be described by reference to the preferred embodiment of the invention illustrated in the accompanying drawings.

Figure 1:
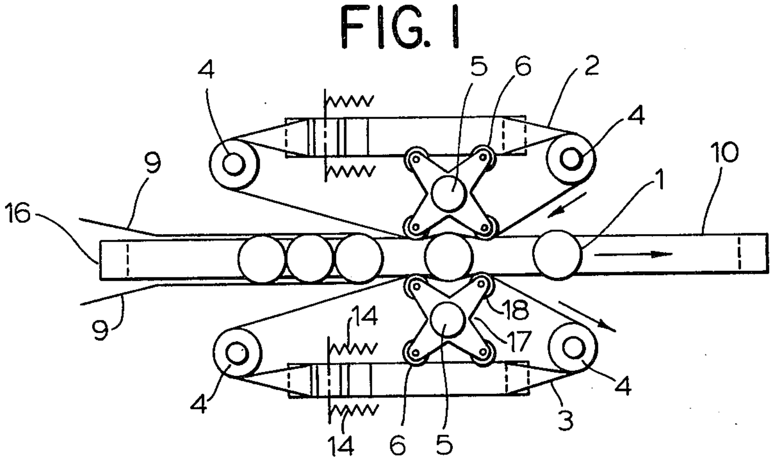
FIG. 1 is a top plan view of a preferred embodiment of apparatus according to the invention.
Figure 2:
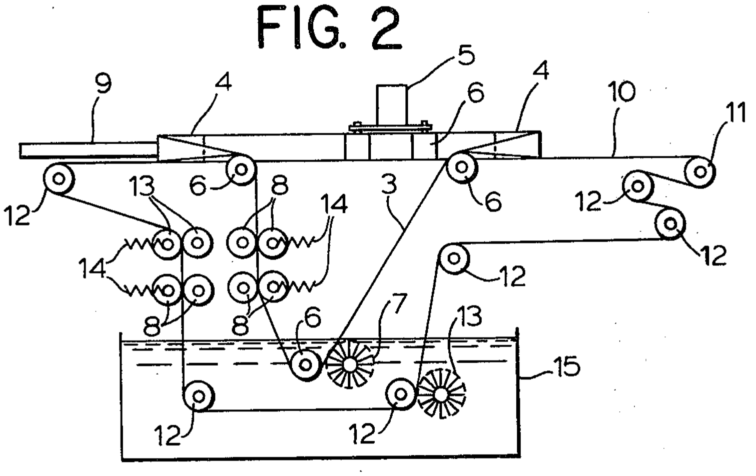
FIG. 2 is a front view of the apparatus of FIG. 1.
Figure 3:
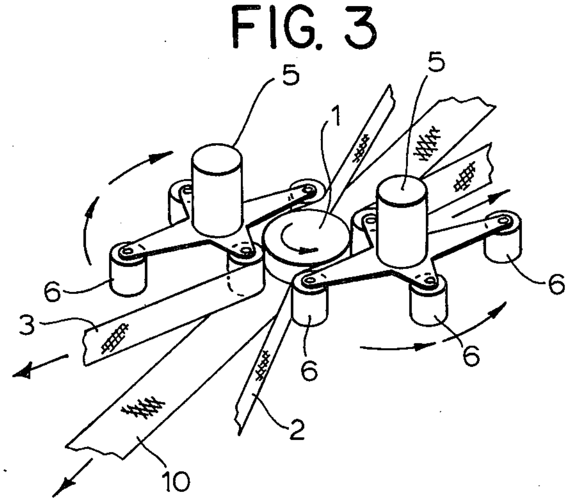
FIG. 3 is an enlarged perspective view of a portion of FIG. 1.

A conveyor 10 is comprised of an endless belt and it is moved at a selected speed by a drive pulley 11 and a plurality of guide rollers 12 (FIG. 2). A soap bar supply apparatus (not shown) supplies soap bars 1 to the feed end 16 of the conveyor 10. The soap bars 1 are guided by guides 9 and are transported on the conveyor 10 in the rightward direction as appearing in FIG. 1. Polishing cloths 2 and 3 are arranged along the sides of the conveyor 10 so as to press against substantially diametrically opposite portions of the circumferential side walls of the soap bars as the soap bars move therepast on the conveyor 10. Although the polishing cloths 2 and 3 extend substantially tangentially to the soap bar, it will be observed that they are deformed into concave form in the regions where they contact the soap bar so as to contact the circumferential wall of the soap bar over arcs of selected length.

The polishing cloths 2 and 3 comprise endless belts which are moved in opposite longitudinal directions, as indicated by arrows in FIG. 1, at selected speeds by driving and dewatering rollers 8 and a plurality of guide rollers 4 and 6. Intermittently rotatable pressing members 5 are rotatably mounted at the positions where the polishing cloths 2 and 3 contact the side walls of the soap bars. The members 5 are arranged so that they are intermittently rotated or indexed, through arcs of about 90° in the disclosed embodiment, in the same direction as the direction of movement of the soap bars on the conveyor 10. Each intermittently rotating member 5 has a plurality of concave portions 17 and a plurality of convex portions 18. In the illustrated embodiment, the convex portions 18 are provided by radially extending arms and the concave portions 17 are provided by the spaces between the arms. Each convex portion 18 has a roller 6 on the radially outer end thereof, which roller is adapted to press against its associated belt 2 or 3. The concave portions 17 are adapted to receive the concave portions of the polishing belts 2, 3 and the corresponding convex portion of the side wall of the soap bar when two rollers 6 are contacting the belts 2, 3 on opposite sides of a soap bar as shown in FIG. 1. The members 5 are disposed symmetrically with each other so that a single soap bar 1 can be interposed therebetween. The members 5 are intermittently rotated so that they momentarily stop in the condition shown in FIG. 1 wherein soap bar 1 partially extends into the opposing concave portions 17 and they then rotate one more step whereby to discharge the soap bar that was previously positioned between them and to permit a new soap bar to be fed in, following which they stop again while holding the subsequent soap bar therebetween. The polishing cloths 2 and 3 are so arranged that they are moved in opposite lengthwise directions whereby to rotate the soap bar that is positioned between them. In the embodiment shown in FIG. 1, the soap bar is rotated counterclockwise.

The endless belts of the conveyor 10 and the polishing cloths 2 and 3 travel through a washing tank 15. Roller-type brushes 7 and 13 are disposed in the tank 15 to remove soil from the belts. Water is removed from the belts by dewatering rollers 8 which are located above the water level in the tank and which are pressed against each other by a spring 14.

In the apparatus of the present invention having the above illustrated structure, soap bars 1 fed on the conveyor 10 are moved by the movement of the conveyor 10 and they are gripped one by one, between an opposed pair of concave portions 17 of the polishing cloths 2, 3 formed when two of the rollers 6 on each member 5 contact said polishing cloths as shown in FIG. 1. In this state, the intermittently rotating members 5 stop momentarily, but the polishing cloths 2 and 3 are continuously moved. Accordingly, the soap bar 1 is caused to rotate with respect to the conveyor 10 about the central axis of the soap bar whereby the entire circumferential wall of the soap bar is contacted and is polished by the polishing cloths 2 and 3. The speed of the polishing cloths 2 and 3 is appropriately adjusted so that some slippage occurs between the circumferential side wall of the soap bar 1 and the polishing cloths 2 and 3 whereby the side wall of the soap bar is cleanly polished. Since the polishing cloths 2 and 3 are moved in directions opposite to each other, if the absolute values of the speeds of movement of both the polishing cloths are equal to each other, the possibility of occurrence of slippage is minimum and the time required for polishing is longer. Therefore, it is preferred that the absolute values of the speeds of movements of both the polishing cloths 2 and 3 are not equal to each other. When the speed of the polishing cloth 2 or 3 that is moving in the same longitudinal direction as the direction of movement of the conveyor 10 is made higher than the moving speed of the conveyor 10, polishing is accomplished in the shortest time.

When the intermittently rotating members 5 are then turned, the polished soap bar 1 is forwarded in the direction of movement of the conveyor 10 and is discharged from the end of the conveyor by an appropriate discharge device (not shown). The intermittently rotating members 5 perform not only the function of discharging the polished soap by rotation but also the function of pressing the polishing cloths against the side wall of the subsequently fed soap bar by gripping the soap bar therebetween when the members 5 are momentarily stopped as described above.

When the apparatus is continuously operated for a long time, soil becomes accumulated on the surfaces of the polishing cloths 2 and 3. Therefore, it is preferred that the polishing cloths 2 and 3 be continuously washed. In the present embodiment, the endless polishing cloths 2 and 3 are dipped in a washing liquor contained in the washing tank 14 and are continuously washed by the washing brush rollers 13 and then they are dewatered by the dewatering rollers 8. Therefore, the apparatus can be operated continuously for a long time.

While a soap bar 1 is being polished between the intermittently rotating members 5, slippage occurs between the conveyor 10 and the bottom face of the soap bar. Accordingly, it is preferred that the conveyor 10 be washed in the same way as the polishing cloths 2 and 3 so as to remove soil that accumulates on the surface of the conveyor 10.

As will be apparent from the foregoing description, the apparatus of the present invention comprises a conveyor for transporting soap bars and a pair of polishing cloths which are pressed against substantially diametrically opposite portions of the periphery of the soap bar. The apparatus of the present invention is characterized in that the apparatus is constructed so that one polishing cloth is moved in the same direction as the direction of movement of the conveyor and the other polishing cloth is moved in a direction opposite to the direction of movement of the conveyor, whereby the soap bars are polished by the polishing cloths while generating slippage between the polishing cloths and the soap bar so as to rotate the soap bars while they are in contact with the polishing cloths. As described above, according to the preferred embodiment of the present invention, endless belts are employed as the conveyor and as the polishing cloths so as to provide continuous operation and a belt washing device is disposed in the paths of movement of these endless belts, whereby the apparatus can be operated continuously for a long time. Pressing of the polishing cloths against the peripheral walls of the soap bars can be accomplished by springs and the like, but it is preferred that this be accomplished by the intermittently rotating members 5 as in the above illustrated preferred embodiment, whereby the polishing time is made equal among the respective soap bars and products of uniform quality can be obtained. When concave and convex portions are formed on the surfaces of these intermittently rotating members 5 and they are so arranged that the side walls of soap bars are pressed into these concave portions along with the polishing cloths and in this state the members 5 temporarily stop, it is possible to polish the side walls of soap bars in a very short time. Further, if rollers are mounted on the convex portions, the movement of the polishing cloths is smoothened. In order to facilitate the manufacture and to enhance the operational efficiency, in the case of ordinary soap bars, it is preferred that the number of such convex portions formed on one intermittently rotating member be four. Of course, five or six of such concave portions can be formed on the intermittently rotating member, if desired. Since soap bars are polished by slippage between the side walls of the soap bars and the polishing cloths, if the polishing cloths are so arranged that the absolute values of the speeds of both the polishing cloths are not equal to each other, such slippage can be caused assuredly and polishing can be performed effectively.

The embodiments of the invention in which an exclusive property or privilege is claimed are defined as follows:

1. An apparatus for polishing objects, such as the circumferential walls of soap bars, comprising: conveyor means for supporting the objects to be polished and moving said objects to and through a polishing station; a pair of movable polishing belts located in opposing relation at said polishing station and extending lengthwise of said conveyor means, said polishing belts being laterally spaced from each other and having mutually confronting surfaces and mutually remote surfaces, said confronting surfaces defining a polishing zone therebetween wherein said polishing belts contact diametrically opposite portions of the objects for polishing same; a pair of indexing members which are respectively associated with the remote surfaces of said polishing belts, said members being disposed on diametrically opposite sides of said polishing zone and being mounted for intermittent indexing rotational movement about parallel axes which are substantially perpendicular to said conveyor means; each of said members having a plurality of circumferentially spaced, substantially radially extending arms having belt-engaging means on the outer ends thereof for engaging said remote surface of its associated polishing belt and pressing its associated belt toward the other belt whereby said confronting surfaces of said belts are pressed into contact with the object in the polishing zone, the spaces between said arms defining concavities so that the portion of the belt in contact with the object can be deformed into said concavities, intermittent rotation of said indexing members being effective to move one object at a time into the polishing zone for polishing thereat and then discharging the polished object from the polishing zone; and means for moving said polishing belts in opposite lengthwise directions whereby to rotate the object while it is located in the polishing zone.

2. An apparatus as set forth in claim 1 wherein said polishing belts are endless belts.

3. An apparatus as set forth in claim 2 wherein said conveyor means is an endless belt and including a belt washing tank disposed in the paths of travel of said endless polishing belts and said conveyor belt for washing same.

4. An apparatus as set forth in claim 1 wherein said belt-engaging means are rollers.

5. An apparatus as set forth in claim 4 wherein the number of said arms is four.

6. An apparatus according to claim 5, in which said conveyor means comprising an endless belt-type conveyor having a reach with a feeding station at one end of said reach and a discharging station at the other end of said reach, said pair of polishing belts comprises a pair of endless polishing belts which have opposed parallel reaches located adjacent the respective side edges of said conveyor between said feeding station and said discharging station and which extend substantially perpendicular to said conveyor whereby objects are moved by said conveyor between said opposed reaches of said polishing belts, the axes of rotation of said indexing members lie in a common plane which extends substantially perpendicular to said reaches of said polishing belts, said arms being arranged so that the rollers on the outer ends of two adjacent arms of both of said indexing members contact the mutually remote surfaces of said polishing belts in said reaches thereof at two corresponding longitudinally spaced points therealong with said indexing members having concavities between said two adjacent arms whereby said polishing belts are pressed together at said points and the portions of the reaches of said belts between said points can be bowed outwardly into said cavities and in sliding contact with the circumferential wall of an object positioned between said points.

* * * * *